(12) United States Patent
Kim et al.

(10) Patent No.: US 12,665,234 B2
(45) Date of Patent: Jun. 23, 2026

(54) ALL-SOLID-STATE BATTERY SYSTEM PROVIDED WITH PRESSURIZING DEVICE

(71) Applicants: Hyundai Motor Company, Seoul (KR); Kia Corporation, Seoul (KR)

(72) Inventors: Min Sun Kim, Goyang (KR); Yong Guk Gwon, Hwaseong (KR); Ga Young Choi, Busan (KR); Yong Seok Choi, Seoul (KR); Jae Ho Shin, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 819 days.

(21) Appl. No.: 17/994,742

(22) Filed: Nov. 28, 2022

(65) Prior Publication Data

US 2023/0420764 A1 Dec. 28, 2023

(30) Foreign Application Priority Data

Jun. 27, 2022 (KR) ........................ 10-2022-0078011

(51) Int. Cl.
H01M 10/625 (2014.01)
H01M 10/052 (2010.01)
(Continued)

(52) U.S. Cl.
CPC ....... H01M 10/625 (2015.04); H01M 10/052 (2013.01); H01M 10/0562 (2013.01);
(Continued)

(58) Field of Classification Search
CPC .... H01M 10/48; H01M 10/04; H01M 10/625; H01M 10/613; H01M 2220/20;
(Continued)

(56) References Cited

U.S. PATENT DOCUMENTS

2016/0016826 A1* 1/2016 Shinoda ................. B01D 61/06
210/134
2020/0168959 A1* 5/2020 Hettrich ............... H01M 4/381
(Continued)

FOREIGN PATENT DOCUMENTS

JP 2015-095281 A 5/2015
JP 2018-181473 A 11/2018
(Continued)

OTHER PUBLICATIONS

Park, S.H.; Jun, D.; Lee, G.H.; Lee, S.G.; Lee, Y.J. Toward high-performance anodeless batteries based on controlled lithium metal deposition: a review, M. Mater. Chem. A 9, p. 14656-14681, pub. May 26, 2021. (Year: 2021).*
(Continued)

Primary Examiner — Gregg Cantelmo
Assistant Examiner — Julia Marie Fehr
(74) Attorney, Agent, or Firm — Fox Rothschild LLP

(57) ABSTRACT

An all-solid-state battery system is disclosed, the system comprising an all-solid-state battery comprising a plurality of cells arranged in a closed inner space of a pressurization chamber and a pressurizing fluid filled in the closed inner space of the pressurization chamber, a state detector configured to detect state information of the all-solid-state battery, a controller configured to output a control signal configured for controlling a pressure applied to the plurality of cells by the pressurizing fluid in the inner space of the pressurization chamber based on the state information of the all-solid-state battery detected by the state detector, and a pressurizing device configured to control the pressure applied to the plurality of cells by the pressurizing fluid according to the control signal outputted by the controller.

18 Claims, 7 Drawing Sheets

(51) Int. Cl.

| | |
|---|---|
| *H01M 10/0562* | (2010.01) |
| *H01M 10/48* | (2006.01) |
| *H01M 10/613* | (2014.01) |
| *H01M 10/6569* | (2014.01) |

(52) U.S. Cl.

CPC ......... *H01M 10/48* (2013.01); *H01M 10/482* (2013.01); *H01M 10/486* (2013.01); *H01M 10/613* (2015.04); *H01M 10/6569* (2015.04); *H01M 2220/20* (2013.01)

(58) Field of Classification Search

CPC ........... H01M 10/6569; H01M 10/052; H01M 10/0562; H01M 10/482; H01M 10/486

See application file for complete search history.

(56) References Cited

U.S. PATENT DOCUMENTS

| | | | |
|---|---|---|---|
| 2021/0091403 A1 | 3/2021 | Ogata et al. | |
| 2022/0336851 A1* | 10/2022 | Nanbu | ................. G01R 31/392 |
| 2025/0007031 A1* | 1/2025 | Montambault | ..... H01M 10/643 |

FOREIGN PATENT DOCUMENTS

| | | |
|---|---|---|
| JP | 2020-068170 A | 4/2020 |
| JP | 2022-052959 A | 4/2022 |
| KR | 2019-0073243 A | 6/2019 |

OTHER PUBLICATIONS

Shao, A.; Tang, X.; Zhang, M.; Bai, M.; Ma, Y. Challenges, Strategies, and Prospects of the Anode-Free Lithium Metal Batteries, Adv. Energy Sustainability Res. 3, 2100197, pub. Jan. 27, 2022. (Year: 2022).*

* cited by examiner

PRESSURE CHANGE ACCORDING TO VALUE K(3Mps)

CONVENTIONAL(4-AXIS PRESSING JIG)
COMPARATIVE EXAMPLE 1
COMPARATIVE EXAMPLE 2
EXAMPLE

PRESSURE(Mpa)

TIME(h)

Cycle Life

Cycle Life

Cycle Life

EXAMPLE

CONVENTIONAL(4-AXIS PRESSING JIG)

ALL-SOLID-STATE BATTERY SYSTEM PROVIDED WITH PRESSURIZING DEVICE

CROSS-REFERENCE TO RELATED APPLICATION(S)

This application claims, under 35 U.S.C. § 119(a), the benefit of priority to Korean Patent Application No. 10-2022-0078011, filed on Jun. 27, 2022, the disclosure of which is incorporated herein by reference in its entirety.

BACKGROUND

Technical Field

Embodiments of the present disclosure relate to an all-solid-state battery system, and more particularly, to an all-solid-state battery system in which the pressure applied to each cell of the all-solid-state battery may be constantly maintained regardless of the charging and discharging states of the cells.

Background

Secondary batteries are rechargeable energy storage devices. Secondary batteries are widely used as power sources not only for small electronic devices such as mobile phones and laptops, but also for large vehicles such as hybrid vehicles and electric vehicles.

Existing secondary batteries have limitations in improving their stability and energy density because cells are typically manufactured based on organic solvents, which are liquid electrolytes. So, there have been active developments of all-solid-state batteries using inorganic solid electrolytes.

In general, an all-solid-state battery has a three-layer laminated structure in which a positive electrode active material layer is bonded to a positive electrode current collector, a negative electrode active material layer is bonded to a negative electrode current collector, and a solid electrolyte layer is stacked between the positive electrode active material layer and the negative electrode active material layer.

Thus, all-solid-state batteries using solid electrolytes are receiving the spotlight in recent years because they are based on a technology that excludes organic solvents, so that they can be manufactured in a safer and simpler form.

However, all-solid-state batteries have limitations in that their energy density and output performance do not reach those of existing lithium-ion batteries using liquid electrolytes, and in order to solve this problem, research to improve the electrodes of all-solid-state batteries is being actively conducted.

In particular, graphite is mainly used as the negative electrode of the all-solid-state battery. In this case, the energy density per weight is very low compared to the lithium-ion battery because ionic conductivity can be secured only when an excessive amount of a solid electrolyte with a large specific gravity is added together with graphite. Additionally, when lithium metal is used as a negative electrode, there are technical limitations in price competitiveness and large scale optimization.

One of the alternatives to overcome these barriers is an anodeless-type all-solid-state battery. The anodeless-type all-solid-state battery is a battery in which lithium is precipitated on a negative electrode current collector instead of using a negative electrode active material such as graphite, or lithium metal as the negative electrode.

Unlike general all-solid-state batteries that use graphite or silicon as a negative electrode active material, the charging and discharging in the anodeless type all-solid-state battery are carried out by precipitating lithium on the current collector, so there is a large difference in volume between the charged state and the discharged state.

As described above, when the anodeless-type all-solid-state battery having a large volume change between the charged state and the discharged state is configured such that a fixed pressure is applied to the cell stack, a large change in the volume of the cells may occur during the charging and discharging, and thus the pressure applied to the cell may change greatly, which may eventually lead to a large change in the pressure of the cell, and thus to the deteriorated performance of the all-solid-state battery.

A known all-solid-state battery comprises a pressing jig that presses the cell laminated structure in which a plurality of cells are stacked in multiple layers and maintains the pressed state. Also, in the known all-solid-state battery, the pressing jig comprises two jig plates stacked on opposite sides of the cell laminated structure with pads interposed on the opposite sides, and a fastening mechanism configured for fixing and fastening the two jig plates on the opposite sides to each other.

In this case, the fastening mechanism may comprise bolts and nuts that are fastened through respective corners of the two jig plates. That is, it may comprise four bolts that are fastened to penetrate the four corner locations in the rectangular jig plate, and nuts.

In the all-solid-state battery, the conventional pressing jig as described above can always apply only a fixed pressure to the cell laminated structure without a change in the pressure, and therefore, if the volume of the cells is greatly changed according to the charging and discharging state as described above, the pressure applied to each cell may be significantly changed.

Accordingly, there is a need for a pressurizing device that allows a constant pressure to be always applied to each cell regardless of a change in the volume of the cells in the all-solid-state battery by flexibly controlling the pressing pressure according to the charging and discharging state of the all-solid-state battery. Since the pressure is mainly applied to the cell laminated structure by the pressing jig as described above only through the pressure points of the four locations to which the fastening mechanism is coupled, greater pressures are applied at the fastening locations corresponding to the pressure points in the cells, and it is difficult to ensure that a uniform pressure is applied over the entire area of the cell. And, depending on the physical properties of the pads which are used to relieve the pressure caused by the volume expansion of the cell, there may occur significant changes in the characteristics of the cell, and they do not provide satisfactory effects on the pressure relief.

Further, when the all-solid-state battery operates at a high temperature after the pressing jig has been fastened at room temperature, the initial pressure may increase rapidly due to the volume expansion of the pad, and there may also be a problem that loosening of screws of the fastening mechanism or changes in physical properties of pads due to long-term operation may lead to the overall pressing force reduction.

SUMMARY

The present disclosure was conceived to address the above problems, and is to provide an all-solid-state battery system that is configured to allow a constant and uniform pressure to always be applied to each cell during charging and discharging of the all-solid-state battery by being configured such that the pressure applied to the cell is controlled and maintained within a certain pressure range regardless of the charging and discharging state of the cells in the all-solid-state battery.

The objects of the present disclosure are limited to the above-described objects, and unmentioned or other objects may be appreciated clearly from the following detailed description by a person having ordinary skill in the art to which the invention belongs.

In order to achieve the above objects, an exemplary embodiment of the present disclosure provides an all-solid-state battery system, the system comprising: an all-solid-state battery comprising a plurality of cells arranged in a closed inner space of a pressurization chamber and a pressurizing fluid filled in the closed inner space of the pressurization chamber; a state detector configured to detect state information of the all-solid-state battery; a controller configured to output a control signal configured for controlling a pressure applied to the plurality of cells by the pressurizing fluid in the inner space of the pressurization chamber based on the state information of the all-solid-state battery detected by the state detector; and a pressurizing device configured to control the pressure applied to the plurality of cells by the pressurizing fluid according to the control signal outputted by the controller.

In this connection, the controller may be configured to output, as the control signal configured for controlling a pressure applied to the plurality of cells, a control signal configured for maintaining a pressure in the pressurization chamber filled with the pressurizing fluid within a predetermined set pressure range.

Additionally, the state information of the all-solid-state battery may comprise cell state information indicating the pressure in the pressurization chamber and whether each cell is charged or discharged, wherein the controller may be configured to output the control signal based on a number of cells being charged and a number of cells being discharged in the plurality of cells, wherein the pressurizing device may be configured to control the supply and discharge of the pressurizing fluid for the pressurization chamber according to the control signal outputted by the controller.

In addition, the pressurizing device may be configured to control a flow rate of the pressurizing fluid supplied to the pressurization chamber or a flow rate of the pressurizing fluid discharged from the pressurization chamber together with an amount of the pressurizing fluid in the pressurization chamber according to the control signal outputted by the controller.

Accordingly, the pressurizing device may be configured to control the supply and discharge of the pressurizing fluid for the pressurization chamber according to the charging and discharging states of the cells in the all-solid-state battery, the all-solid-state battery system according to the present disclosure can maintain and control the pressure applied to each cell within the set pressure range even if the volume of each cell is changed according to the charging and discharging state of the cells in the all-solid-state battery. Further, a uniform pressure can be applied to each cell in the all-solid-state battery, and consequently, the performance of the all-solid-state battery can be improved.

The all-solid-state battery system according to the present disclosure is more useful when applied to an anodeless-type all-solid-state battery in which a large change in the volume of cells occurs depending on the charging and discharging state.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
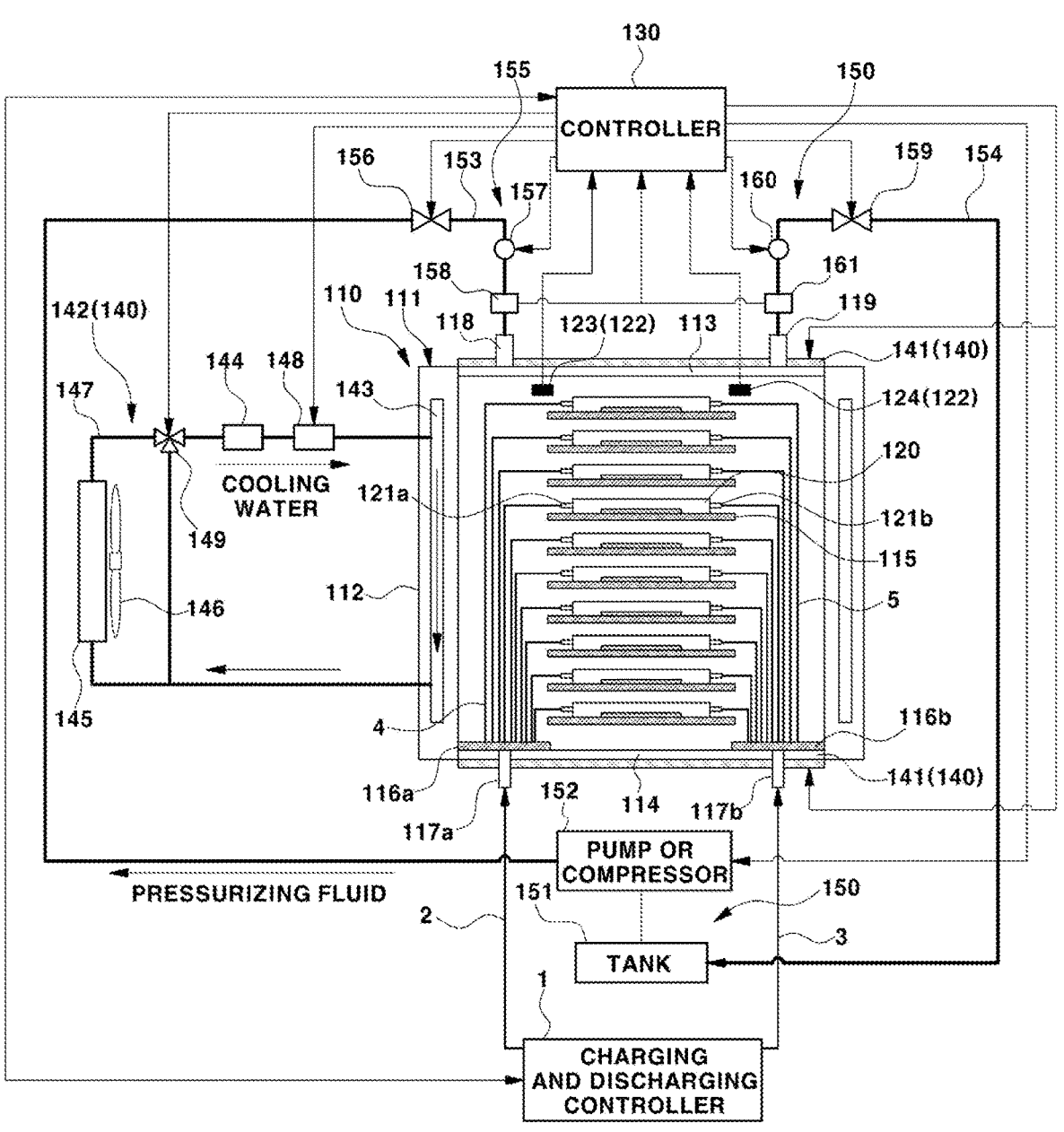
FIG. 1 is a block diagram showing an all-solid-state battery system according to an exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, embodiments of the invention will be described with reference to the accompanying drawings. Specific structural or functional descriptions presented in the embodiments of the present disclosure are provided merely by way of example for the purpose of describing embodiments according to the concept of the present disclosure, and the embodiments according to the concept of the present disclosure may be realized in various forms. Additionally, the invention should not be construed as being limited by the embodiments described herein, but should be understood as including all changes, equivalents, and substitutes within the technical idea and scope of the present disclosure.

Meanwhile, terms such as first, second and the like may be used to explain various components, but the components are not limited by these terms. The above terms are used only for the purpose of distinguishing one component from other components. For example, the first component can be designated as the second component without departing from the scope of the present disclosure, and, similarly, the second component can also be designated as the first component.

Further, when one element is referred to as being "connected" or "accessed" to another element, it should be understood that the one element may be directly connected or accessed to the other element or any intervening element may also be present therebetween. Contrarily, when one element is referred to as being "directly connected" or "directly accessed" to another element, it should be understood as that no other element is present therebetween. Other expressions for describing the relationships between components, that is, expressions such as "between" and "directly between" or "adjacent to" and "directly adjacent to" should be interpreted similarly.

The same reference numerals are used throughout the specification to designate the same components. As used herein, the terms are for the purpose of describing the embodiments, and are not intended to limit the present disclosure. Herein, terms in the singular form also relate to the plural form unless specifically stated otherwise in the context. As used herein, the terms "comprises" and/or "comprising" specify the presence of stated components, steps, operations, and/or elements, but do not preclude the presence or addition of at least one other component, step, operation, and/or element.

Figure 2:
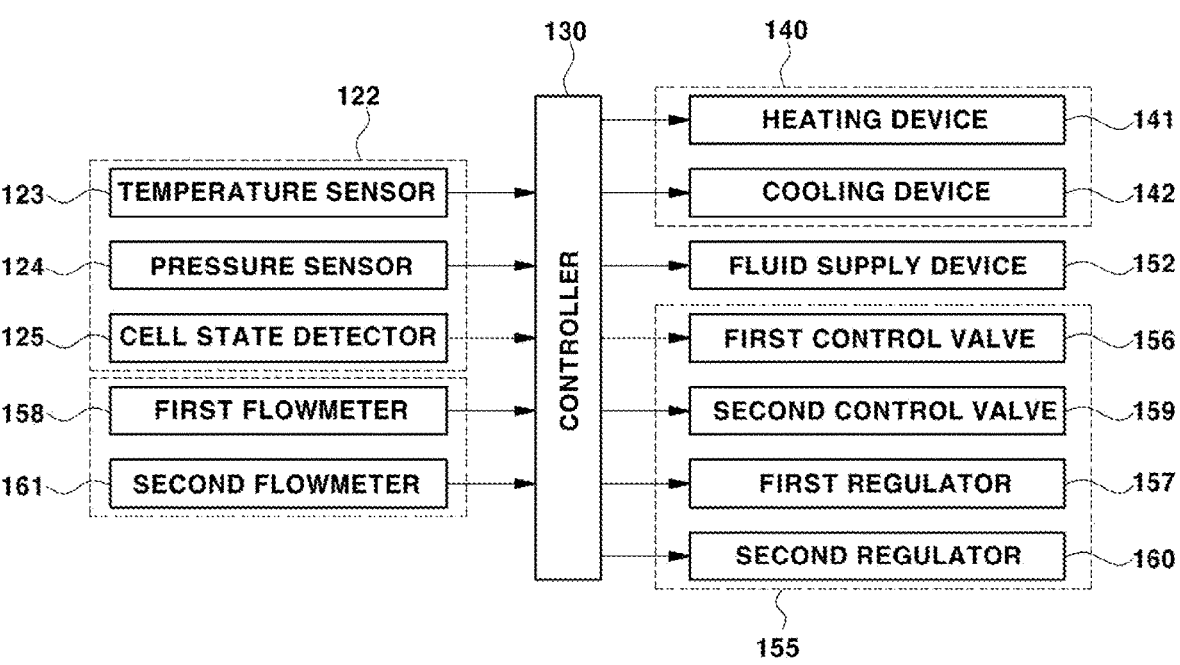
FIG. 2 is a block diagram showing main components of an all-solid-state battery system according to an exemplary embodiment of the present disclosure.

FIG. 1 is a block diagram showing an all-solid-state battery system according to an exemplary embodiment of the present disclosure, and FIG. 2 is a block diagram showing the main configuration of an all-solid-state battery system according to an exemplary embodiment of the present disclosure.

The all-solid-state battery system according to an exemplary embodiment of the present disclosure may be mounted on an actual vehicle to be used as a vehicle battery system which may be a power source of the vehicle. In particular, it can be used as a high-voltage battery system configured to supply operating power to a motor (not shown), which may be a driving device for driving the vehicle in an electric vehicle.

Although not shown in the drawings, the all-solid-state battery in the all-solid-state battery system according to the embodiment of the present disclosure may be provided so that it can be discharged and charged by the motor through the dischargeable and chargeable connection to the motor via an inverter.

Additionally, in the all-solid-state battery system according to an exemplary embodiment of the present disclosure, although not shown in the drawings, the all-solid-state battery may be connected to an in-vehicle charging device comprising a converter, and the like, and may be charged by receiving power supplied from a charger outside the vehicle through the in-vehicle charging device, or it may be charged by receiving power directly from a power supply device outside the vehicle.

Alternatively, the all-solid-state battery system according to an exemplary embodiment of the present disclosure may be provided and used as an evaluation system for evaluating a vehicle or a battery in a vehicle development stage or an all-solid-state battery development stage, rather than being mounted on an actual mass-production vehicle.

To this end, the all-solid-state battery system according to an exemplary embodiment of the present disclosure may comprise a component configured to be connected with an external power supply to enable a cell activation, a charging and discharging process, or the like.

Hereinafter, referring to the drawings, as shown, an all-solid-state battery system according to an exemplary embodiment of the present disclosure may comprise an all-solid-state battery 110, a state detector 122, a controller 130, and a temperature adjusting device 140, and a pressurizing device 150.

The all-solid-state battery 110 may comprise a plurality of cells 120, and each cell 120 may be a pouch-type cell constituting a known all-solid-state battery (hereinafter, referred to as a 'pouch cell').

Further, in an exemplary embodiment of the present disclosure, the all-solid-state battery 110 may be an anodeless-type all-solid-state battery, and the cell 120 may be a cell of the anodeless-type all-solid-state battery. For example, the cell 120 may comprise a configuration in which a negative electrode current collector, a solid electrolyte layer, a positive electrode layer, and a positive electrode current collector are stacked.

In addition, the cell 120 may be a pouch cell having the aforementioned components sealed with a laminate film of a flexible material in a vacuum state, and the cell 120 may comprise a portion of each of the negative electrode current collector and the positive electrode current collector or a terminal coupled to each of the current collectors which may be protruded out of the laminate film, allowing the protruding portion to be used as a positive electrode terminal 121*b* and the negative electrode terminal 121*a*.

In addition, in the embodiment of the present disclosure, the all-solid-state battery 110 may further comprise a pressurization chamber 111 which has a sealable inner space filled with a pressurizing fluid to be described later, and in which the plurality of cells 120 are accommodated in the inner space so that they are spaced apart from each other at a predetermined interval.

The pressurization chamber 111 may comprise a side portion 112 disposed along the entire circumference on the side surface, a top surface portion 113 disposed on the upper end of the side portion, and a bottom surface portion 114 disposed on the lower end of the side portion, and may be a case-type structure in which the inner space is sealed by the side portion 112, the top surface portion 113, and the bottom surface portion 114.

Although not shown in detail in the drawings, the pressurization chamber 111 may be configured such that the cells 120 accommodated in the inner space of the pressurization chamber can be replaced after all components of the pressurization chamber 111 are assembled, that is, such that: the stored cell 120 can be discharged to the outside and the new cell 120 can be accommodated therein; the inner space can be opened or closed; and at least a portion of the side portion 112, the top surface portion 113, and the bottom surface portion 114 can be selectively separated or combined with other remaining parts in the assembled state.

In addition, a support 115 may be installed on the inner surface of the side portion 112 of the pressurization chamber 111 at each cell location, and in this case, the cells 120, that is, the pouch cells described above are disposed in the inner space of the pressurization chamber 111 so as to be spaced apart from each other while each of the cells may be supported by each of supports 115.

In this case, the cells 120 and the supports 115 may be installed to be arranged at regular intervals with an interposed regular gap. FIG. 1 shows an example in which the cells 120 are spaced apart from each other at equal intervals along an up and down direction in the inner space of the pressurization chamber 111 in a state of being supported by the respective supports 115.

The arrangement state of the cells illustrated in FIG. 1 is illustrative, and the present disclosure is not limited thereto, and the arrangement state or arrangement structure of the cells in the inner space of the pressurization chamber can be variously modified from the example of FIG. 1.

Additionally, although FIG. 1 shows an example in which all cells 120 are arranged at constant intervals in the inner space of the pressurization chamber 111, this is illustrated by way of an example, and all cells 120 are not necessarily arranged at equal intervals. In the present disclosure, any arrangement state or arrangement structure of the cells in the pressurization chamber can be adopted as long as the pressurization can be made in an isostatic pressure with respect to all cells.

Then, the negative electrode (−) and positive electrode (+) terminal plates 116*a* and 116*b* are installed to be fixed to the inner surface of the pressurization chamber 111. In this case, to the pressurization chamber 111, a negative electrode (−) external terminal 117*a* electrically connected to the negative electrode (−) terminal plate 116*a*, and a positive electrode (+) external terminal 117*b* electrically connected to the positive electrode (+) terminal plate 116*b* are installed.

Each of the external terminals 117*a* and 117*b* may be installed to have a shape and structure protruding from the corresponding terminal plate 116*a* and 116*b* to the outside of the pressurization chamber by penetrating the pressurization chamber 111, and the negative electrode (−) external terminal 117*a* and the positive electrode (+) external terminal 117*b* protruding to the outside of the pressurization chamber are connected to a charging and discharging controller 1 through electric wires 2 and 3. The charging and discharging controller 1 may be a battery management system (BMS) in a typical vehicle.

In addition, each of the negative electrode terminals 121*a* of all the cells 120 may be individually connected to the terminal plate 116*a* of the negative electrode through the electrical conductive wire 4, and each of the positive electrode terminals 121*b* of all the cells 120 is individually connected to the terminal plate 116*b* of the positive electrode through the electrical conductive wire 5.

In the embodiment of the present disclosure, although the negative electrode terminal 121*a* and the positive electrode terminal 121*b* installed in each cell 120 are portions to which the electrical conductive wires 4 and 5 are connected for electrical connection with the corresponding terminal plates 116*a* and 116*b*, they are installed in the inner space of the pressurization chamber 111 to always maintain an insulating state from surrounding parts or surrounding materials except for the electric wires.

For example, so that the negative electrode terminal 121*a* and the positive electrode terminal 121*b* of each cell 120 are provided such that they are always insulated so as not to be electrically connected with surrounding components of the pressurization chamber 111 or the pressurizing fluid filled in the inner space of the pressurization chamber.

Referring to FIG. 1, the negative electrode terminal plate 116*a* and the positive electrode terminal plate 116*b* are installed on the inner surface of the bottom surface portion 114 of the pressurization chamber 111, and the negative electrode external terminal 117*a* and the positive electrode external terminal 117*b* are installed so as to penetrate the bottom surface portion 114 of the pressurization chamber 111.

In this regard, with the external terminal 117*a* of the negative electrode and the external terminal 117*b* of the positive electrode connected to the corresponding terminal plates 116*a* and 116*b*, they are configured to penetrate the bottom surface portion 114 of the pressurization chamber 111 and a heating device 141 to be described later, but each of the external terminals 117*a* and 117*b* may be provided so as to always maintain electrical insulation from the components of the pressurization chamber and the heating device.

Meanwhile, the all-solid-state battery system according to an exemplary embodiment of the present disclosure may further comprise: a state detector 122 configured to detect real-time state information of the all-solid-state battery 110; a controller 130 configured to output a control signal configured for controlling the temperature of the all-solid-state battery 110 and the pressure applied to the cells of the all-solid-state battery 110 based on the real-time state information of the all-solid-state battery 110 detected by the state detector 122; a temperature adjusting device 140 that operates to control the temperature of the all-solid-state battery 110 according to the control signal output by the controller 130; and a pressurizing device 150 that operates to control the pressure applied to the cells 120 of the all-solid-state battery 110 according to the control signal outputted by the controller 130.

In the embodiment of the present disclosure, the state detector 122 may comprise a pressure sensor 124 configured to detect the pressure applied to the cell 120 of the all-solid-state battery (110). Also, in the embodiment of the present disclosure, the state detector 122 may further comprise a temperature sensor 123 configured to detect the temperature of the all-solid-state battery 110. In this case, the real-time state information of the all-solid-state battery 110 may comprise the temperature of the all-solid-state battery and the pressure applied to the cells of the all-solid-state battery.

The temperature sensor 123 may be installed in the inner space of the pressurization chamber 111, so the temperature detected by the temperature sensor 123 may become the inner temperature of the pressurization chamber 111. In the present disclosure, the inner temperature of the pressurization chamber 111 detected by the temperature sensor 123 may be considered as the temperature of the cell 120 installed in the inner space of the pressurization chamber 111.

The pressure sensor 124 may be installed in the inner space of the pressurization chamber 111, so the pressure detected by the pressure sensor 124 may become the inner pressure of the pressurization chamber 111. In addition, the pressure detected by the pressure sensor 124 may be considered as the pressure of the pressurizing fluid filled in the inner space of the pressurization chamber 111, and also as the pressure applied to each cell 120 by the pressurizing fluid in the pressurization chamber 111.

In the following description, the internal pressure of the pressurization chamber and the pressure within the pressurization chamber are used as the same meaning, and all refer to the pressure of the pressurizing fluid filled in the inner space of the pressurization chamber 111, as well as the pressure applied to the cell 120 by the pressurizing fluid.

In the present disclosure, each cell 120 of the all-solid-state battery 110 may be arranged in the inner space of the pressurization chamber 111 to receive the same pressure, so, when the pressurizing fluid is filled in the inner space of the pressurization chamber 111, all the cells 120 in the pressurization chamber 111 are pressurized by isostatic pressure of the pressurizing fluid, and thus the pressure of the pressurizing fluid becomes the pressure applied to each cell 120.

The temperature sensor 123 and the pressure sensor 124 are connected to the controller 130 so that their output signals can be inputted thereto, and thus a signal outputted from each sensor, that is, a sensor signal that is an electrical signal indicating temperature or pressure, can be inputted to the controller 130.

Additionally, in the embodiment of the present disclosure, the state detector 122 may further comprise a cell state detector 125 configured to detect cell state information indicating whether each cell 120 in the pressurization chamber 111 is charged or discharged.

Accordingly, in the embodiment of the present disclosure, the real-time state information of the all-solid-state battery 110 may further comprise the cell state information indicating whether each cell 120 is charged or discharged, in addition to the pressure and temperature in the pressurization chamber 111.

Here, the cell state information indicating whether each cell is charged or discharged may comprise a voltage (cell voltage) of each cell 120, and in this case, the cell state detector 125 may comprise a voltage detector configured to detect the voltage of each cell 120 in the pressurization chamber 111.

And, in the embodiment of the present disclosure, the temperature adjusting device 140 may be configured to control the temperature of the all-solid-state battery 110 in real time, and may be used to maintain and control the temperature of the all-solid-state battery in a certain temperature range.

Specifically, the temperature adjusting device 140 may be used to maintain the temperature of the pressurization chamber 111 in the all-solid-state battery 110 in a predetermined set temperature range, and may be controlled by the controller 130 to maintain the temperature of the pressurization chamber 111 in the set temperature range.

In an exemplary embodiment of the present disclosure, the temperature adjusting device 140 may comprise a heating device 141 configured to raise the temperature of the all-solid-state battery 110 and a cooling device 142 configured to cool the all-solid-state battery 110, to maintain and control the temperature of the entire pressurization chamber 111 in a set temperature range.

The heating device 141 may be an electric heater installed in the pressurization chamber 111 of the all-solid-state battery 110 and operated by receiving battery power to maintain the temperature of the all-solid-state battery at a high temperature, and in this case, the battery as the power source of the electric heater may be the all-solid-state battery to be heated in which the electric heater is installed.

The electric heater, which is the heating device 141 in the embodiment of the present disclosure, may be installed on the top surface portion 113 and the bottom surface portion 114 of the pressurization chamber 111. Specifically, the electric heaters of the heating device 141 may be band heaters, and as illustrated in FIG. 1, may be installed on the outer surface of the top surface portion 113 and the bottom surface portion 114 of the pressurization chamber 111, respectively.

When the electric heater is installed in the pressurization chamber, since the electric heater is an electric device that operates by receiving electricity, the electric heater should be installed to maintain complete insulation from neighboring parts, structures, and neighboring materials of the top surface portion 113 and bottom surface portion 114 of the pressurization chamber 111, the external terminals 117a and 117b, the terminal plates 116a and 116b, an inlet port 118 and outlet port 119 to be described later, and the like.

In an exemplary embodiment of the present disclosure, the operation of the heating device 141 is controlled by the controller 130, and specifically, the heating device 141 is provided such that it is turned on/off according to a control signal outputted by the controller 130.

In the embodiment of the present disclosure, the cooling device 142 may be a water-cooled cooling device using cooling water, and the water-cooled cooling device may comprise a cooling water passage 143 provided in the pressurization chamber 111, a reservoir tank 144 in which the cooling water is stored, a radiator 145 and a cooling fan 146 for the heat dissipation of the cooling water, a cooling water line 147 connecting among the cooling water passage 143 of the pressurization chamber 111, the reservoir tank 144, and the radiator 145, a water pump 148 for circulating the cooling water along the cooling water line 147, a valve device 149 for controlling the circulation and flow of the cooling water, and the like.

The cooling water passage 143 may be a water jacket formed in the pressurization chamber 111, and specifically, the water jacket may be formed such that the cooling water passes through the side surface portion 112 of the pressurization chamber 111.

In the embodiment of the present disclosure, the cooling device 142 is configured to be controlled according to the control signal outputted by the controller 130, similarly to the heating device 141. The configuration of the water-cooled cooling device controlled by the controller is well known to those skilled in the art.

In the present specification, the components of the water-cooled cooling device, that is, the cooling water passage (water jacket) 143 and the reservoir tank 144, the radiator 145 and the cooling fan 146, the cooling water line 147, the water pump 148, the valve device 149 and the like are well-known components to a person skilled in the art of a water-cooled cooling device, so more detailed descriptions for them will be omitted.

Next, the pressurizing device 150 is configured to pressurize each of the cells 120 disposed in the inner space of the pressurization chamber 111 in an isostatic pressure, and is configured to control and maintain the pressure applied to the cell 120 of the all-solid-state battery 110 within a certain pressure range at all times regardless of the charging and discharging state of the cell and the change in the volume of the cell.

In an exemplary embodiment of the present disclosure, the pressurizing device 150 may comprise a configuration configured to supply a pressurizing fluid to the pressurization chamber 111 of the all-solid-state battery 110 and control the pressure applied to each cell 120 by the pressurizing fluid in a way of controlling the supply and discharge of the pressurizing fluid in the pressurization chamber 111. According to an exemplary embodiment, the configuration is a fluid adjusting device.

That is, during charging and discharging of the all-solid-state battery 110, the temperature adjusting device 140 ensures that the temperature in the pressurization chamber 111 of the all-solid-state battery 110 is constantly maintained within a predetermined temperature range (a set temperature range to be described later), and at the same time, the pressurizing device 150 ensures that the pressure in the pressurization chamber 111 of the all-solid-state battery 110 is constantly maintained within a predetermined pressure range (a set pressure range to be described later).

Thereby, the pressure applied to each cell 120 in an isostatic pressure state during the charging and discharging of the all-solid-state battery 110 can always be constantly maintained within the pressure range regardless of the charging and discharging state of the cell and the volume change of the cell, and also, the uniform pressure can be applied to all the cells 120 in the pressurization chamber 111.

In an exemplary embodiment of the present disclosure, the supply and discharge of the pressurizing fluid to the pressurization chamber is controlled to adjust the pressure in the pressurization chamber 111, and the flow rate of the pressurizing fluid supplied to the pressurization chamber (supply rate) and the flow rate of the pressurizing fluid discharged from the pressurization chamber (discharge rate) are controlled in order to keep the pressure in the pressurization chamber constant within the target pressure range, that is, within the predetermined pressure range (set pressure range).

In the embodiment of the present disclosure, the pressurizing device 150 comprises a fluid storing part 151 in which the pressurizing fluid is stored, a fluid supply device 152 configured to supply the pressurizing fluid stored in the fluid storing part 151 to the pressurization chamber 111 of the all-solid-state battery 110, fluid lines 153 and 154 configured to connect among the fluid supply device 152, the pressurization chamber 111 of the all-solid-state battery 110 and the fluid storing part 151, and a fluid controller 155 installed in the fluid lines 153 and 154 and configured to control the supply and discharge of a pressurizing fluid for the pressurization chamber 111 of the all-solid-state battery 110 according to a control signal outputted by the controller 130.

The fluid storing part 151 may be a tank in which the pressurizing fluid is stored. In the embodiment of the present disclosure, the pressurizing fluid may be a liquid or a gas, preferably a liquid or gas having an electrical conductivity of at least less than 10-10 S/cm.

Additionally, in the embodiment of the present disclosure, it is preferable to use a liquid or gas that maintains a liquid or gaseous state in a temperature range of $-20°$ C. to $70°$ C. and does not cause an electrochemical reaction as the pressurizing fluid, and, more preferably, a liquid or gas in which an electrochemical reaction does not occur even at 5 V or higher electrochemically may be used as the pressurizing fluid.

Further, in the embodiment of the present disclosure, when the pressurizing fluid is a gas, it may be air, argon, nitrogen, or the like, while, when the pressurizing fluid is a liquid, it may be an oil used in WIP (Warm Isostatic Pressure) processes, pressurization pumps or the like while being electrically non-conductive. Preferably, an electrically non-conductive non-flammable liquid or an inert gas may be used as the pressurizing fluid, and, for example, argon or nitrogen may be used as the inert gas.

In the embodiment of the present disclosure, the fluid supply device 152 may be a pump or a compressor driven to supply the pressurizing fluid stored in the fluid storing part 151 to the pressurization chamber 111. The pump or compressor is provided such that its operation can be controlled according to a control signal outputted by the controller 130.

In the embodiment of the present disclosure, the fluid line may comprise an inlet side fluid line 153 connected from the fluid supply device 152 to the inlet port 118 of the pressurization chamber 111, and an outlet side fluid line 154 connected from the outlet port 119 of the pressurization chamber 111 to the fluid storing part 151.

The inlet side fluid line 153 and the inlet port 118 of the pressurization chamber 111 are a passage configured to supply the pressurizing fluid to the inner space of the pressurization chamber 111, and the outlet port 119 of the pressurization chamber 111 and the outlet side fluid line 154 are a passage for discharging the pressurizing fluid from the inner space of the pressurization chamber 111.

And, in the embodiment of the present disclosure, the fluid controller 155 may comprise a first control valve 156 and first regulator 157 installed on the inlet side fluid line 153, a first flowmeter 158, a second control valve 159 and second regulator 160 installed on the outlet side fluid line 154, and a second flowmeter 161.

The first flowmeter 158 in the inlet side fluid line 153 is configured to detect the supply flow rate of the pressurizing fluid supplied to the pressurization chamber 111, and the second flowmeter 161 in the outlet side fluid line 154 is configured to detect the discharge flow rate of the pressurizing fluid discharged from the pressurization chamber 111.

As described above, the first flowmeter 158 and the second flowmeter 161 are configured to detect the flow rates of the pressurizing fluid flowing along the inlet side fluid line 153 and the outlet side fluid line 154, respectively, and each flowmeter is connected to the controller 130 so that it can input a signal thereto. Accordingly, a signal outputted from each of the flowmeters 158 and 161, that is, a flow rate detection signal which is an electrical signal representing a detected flow rate value, can be inputted to the controller 130.

Additionally, the controller 130 controls the operation of the pressurizing device 150 so that the pressure in the pressurization chamber is within a predetermined set pressure range based on the pressure in the pressurization chamber 111 detected by the pressure sensor 124, wherein in order to maintain the pressure in the pressurization chamber 111 within the set pressure range, based on the real-time pressure information about the inside of the pressurization chamber 111 detected by the pressure sensor 124 and the flow rates (flow rate) of the pressurizing fluid detected by the respective flowmeters 158 and 161, the controller controls the operation of the first control valve 156, the first regulator 157, the second control valve 159, and the second regulator 160.

At this time, from the supply flow rate of the pressurizing fluid detected by the first flowmeter 158, the controller 130 can know the flow rate of the pressurizing fluid supplied to the pressurization chamber 111, and this flow rate may be referred to as a flow rate of the pressurizing fluid passing through the first regulator 157.

In addition, from the discharge flow rate of the pressurizing fluid detected by the second flowmeter 161, the controller 130 can know the flow rate of the pressurizing fluid discharged from the pressurization chamber 111, and this flow rate may be referred to as a flow rate of the pressurizing fluid passing through the second regulator 160.

In the embodiment of the present disclosure, the controller 130 outputs a control signal configured for maintaining the pressure in the pressurization chamber 111 within the set pressure range, and the operation of each of the control valves 156 and 159 and the regulators 157 and 160 is controlled according to the control signal output from the controller 130.

At this time, the controller 130 controls the opening degree of the first regulator 157 by using the real-time flow rate information obtained from the flow rate information detected by the first flowmeter 158 as feedback information, and controls the flow rate of the pressurizing fluid passing through the first regulator 157 so that the pressure in the pressurization chamber 111 can be maintained at a value within the set pressure range.

Similarly, the controller 130 controls the opening degree of the second regulator 160 by using the real-time flow rate information obtained from the flow rate information detected by the second flowmeter 161 as feedback information, and controls the flow rate of the pressurizing fluid passing through the second regulator 160 so that the pressure in the pressurization chamber 111 can be maintained at a value within the set pressure range.

In the embodiment of the present disclosure, the first control valve 156 and the second control valve 159 may be electromagnetic valves whose open/close state is controlled according to the control signal of the controller 130, that is, the electrical signal outputted by the controller 130. For example, the first control valve 156 and the second control valve 159 may be solenoid valves whose open/close state is controlled according to the control signal from the controller 130.

The first control valve 156 and the second control valve 159 allow the pressurizing fluid to be supplied to the pressurization chamber 111 or the pressurizing fluid to be discharged from the pressurization chamber 111 according to the operating state, through which the amount of the pressurizing fluid filled in the pressurization chamber 111 is adjusted to increase or decrease the pressure in the pressurization chamber 111.

In order to increase or decrease the pressure in the pressurization chamber 111, the one selected from the first control valve 156 and the second control valve 159 is controlled to be opened and the other is controlled to be closed, wherein when the first control valve 156 is opened, the pressurizing fluid may be supplied to the pressurization chamber 111, and when the second control valve 159 is opened, the pressurizing fluid may be discharged from the pressurization chamber 111.

Also, when the first control valve 156 is opened and the pressurizing fluid is supplied to the pressurization chamber 111, the pressure in the pressurization chamber increases, while, when the second control valve 159 is opened and the pressurizing fluid is discharged from the pressurization chamber 111, the pressure in the pressurization chamber decreases.

And, the first regulator 157 and the second regulator 160 may be electronic regulators whose opening degree is controlled according to an electrical signal (control signal) outputted by the controller 130, and the flow rates of the pressurizing fluid passing through the corresponding fluid lines (153 and 154) are adjusted according to the controlled opening degrees.

As described above, in the embodiment of the present disclosure, by controlling the operation of the first control valve 156 and the second control valve 159, and the first regulator 157 and the second regulator 160 the pressurization chamber 111, the supply and discharge of the pressurizing fluid for the pressurization chamber 111 can be controlled. Additionally, through this, the flow rate of the pressurizing fluid supplied to and discharged from the pressurization chamber 111, the pressure in the pressurization chamber, the amount of the pressurizing fluid in the pressurization chamber, and the like can all be controlled.

In the embodiment of the present disclosure, the pressure in the pressurization chamber 111 may be controlled within a preset pressure range, for example, within a pressure range of 1 MPa to 5 MPa, by the pressurizing device 150 during the charging and discharging of the all-solid-state battery 110, and the temperature in the pressurization chamber 111 may be controlled within a preset temperature range, for example, a temperature range of −20° C. to 50° C., by the temperature adjusting device 140.

At this time, the controller 130 uses the temperature in the pressurization chamber 111 detected by the temperature sensor 123 of the state detector 122 as feedback information during charging and discharging of the all-solid-state battery 110, to control the operation of the temperature adjusting device 140 so that the temperature in the pressurization chamber 111 can be maintained constant within the set temperature range.

Additionally, the controller 130 may use the pressure in the pressurization chamber 111 detected by the pressure sensor 124 of the state detector 122 as feedback information during charging and discharging of the all-solid-state battery 110, to control the operation of the pressurizing device 150 so that the pressure in the pressurization chamber 111 can be maintained constant within the set pressure range.

In the present disclosure, the pressurizing device 150 controls and maintains the pressure in the pressurization chamber 111 within the predetermined set pressure range by controlling the supply and discharge of the pressurizing fluid for the pressurization chamber 111 of the all-solid-state battery 110 based on the real-time state information of the all-solid-state battery 110 during the charging and discharging.

At this time, the controller 130 controls the operation of the pressurizing device 150, in particular the operation of the fluid supply device 152 and the fluid controller 155 to control the flow rate and flow velocity of the pressurizing fluid supplied to the pressurization chamber 111 through the fluid lines 153 and 154, or to control the flow rate and flow velocity of the pressurizing fluid discharged from the pressurization chamber 111 through the fluid lines 153 and 154, through which the pressure in the pressurization chamber 111 is controlled in real time.

For example, the pressurizing device 150 may be configured to control the pressure in the pressurization chamber 111 in a scale of 0.01 MPa by controlling the flow rate and flow velocity of the pressurizing fluid supplied to or discharged from the pressurization chamber 111 during charging and discharging of the all-solid-state battery 110.

Additionally, the pressurizing device 150 controls the flow rate and flow velocity of the pressurizing fluid supplied to the pressurization chamber 111 or controls the flow rate and flow velocity of the pressurizing fluid discharged from the pressurization chamber (111) in order to maintain the pressure in the pressurization chamber within the set pressure range when there occurs a change in the pressure in the pressurization chamber 111. Here, the pressure in the pressurization chamber 111 is a pressure applied to each cell 120 in an isostatic pressure by the pressurizing fluid as described above.

Figure 3:
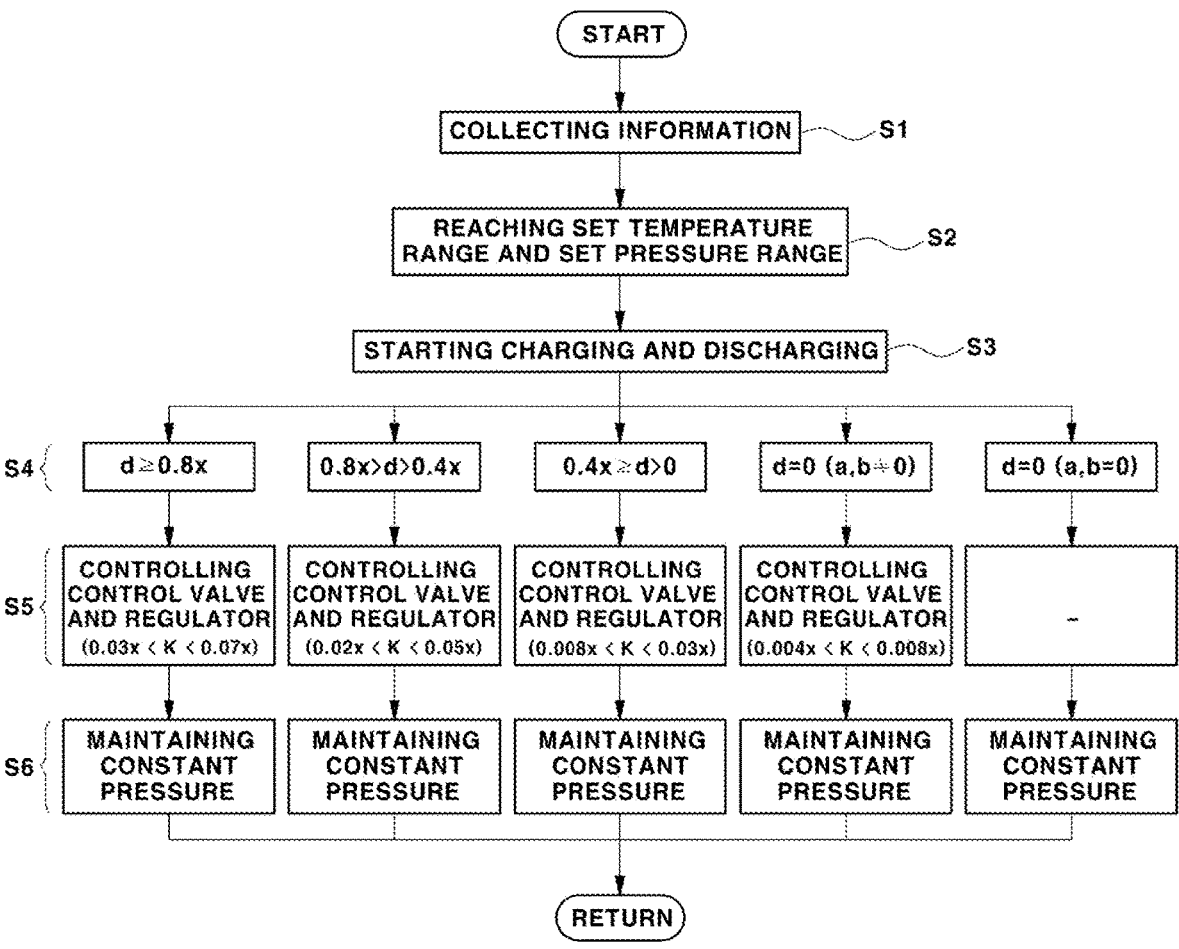
FIG. 3 is a flowchart representing a control state of an all-solid-state battery system according to an exemplary embodiment of the present disclosure.

Meanwhile, FIG. 3 is a flowchart illustrating a control state of an all-solid-state battery system according to an exemplary embodiment of the present disclosure, and the control and operation state of the all-solid-state battery system will be described with reference to this.

In FIG. 3, 'a' indicates the number of cells being charged in all cells 120 of the all-solid-state battery 110, 'b' indicates the number of cells being discharged, and in this case, 'd' is defined as the difference ($|a-b|$) between the number of cells being charged (a) and the number of cells being discharged (b). That is, expressed as an equation, it defines a relationship of '$d=|a-b|$' In addition, 'x' represents the number of all the cells 120 of the all-solid-state battery 110, that is, the number of all the cells 120 in the pressurization chamber 111, and 'K' represents the flow rate of the pressurizing fluid (ml/min).

First, the state information of the all-solid-state battery 110 is detected by the state detector 122, and the controller 130 obtains the real-time state information of the all-solid-state battery 110 detected by the state detector 122 (step S1).

At this time, the temperature in the pressurization chamber 111 is detected by the temperature sensor 123 of the state detector 122, and the pressure in the pressurization chamber 111 is detected by the pressure sensor 124 of the state detector 122. Thus, the controller 130 obtains the real-time temperature information and pressure information on the inside of the pressurization chamber 111 of the all-solid-state battery 110.

When determining that the temperature in the pressurization chamber 111 is within the set temperature range and the pressure in the pressurization chamber 111 is within this set pressure range based on the real-time temperature information and pressure information in the pressurization chamber 111 obtained by the temperature sensor 123 and the pressure sensor 124 (step S2), the controller 130 allows the charging and discharging of the cells 120 in the pressurization chamber 111 to begin.

Additionally, the controller 130 performs the control process of FIG. 3 during the charging and discharging of the cells (step S3). To this end, the controller 130 obtains, as another real-time state information of the all-solid-state battery 110 detected by the state detector 122 during the charging and discharging, the cell state information indicating whether each cell 120 in the pressurization chamber 111 is charged or discharged at intervals of a predetermined set time (e.g., 10 minutes).

At this time, the controller 130 can know whether each cell 120 is charged or discharged based on the state of each cell 120, for example, the voltage state of each cell 120 detected by the voltage detector, and as a result, can know the number of the cells being charged (a) and the number of the cells being discharged (b) among all the cells 120 in the pressurization chamber 111.

Accordingly, the controller 130 can calculate the difference value d from the number of cells being charged (a) and the number of cells being discharged (b) at a set time interval ($d=|a-b|$), and the calculated value d may be used to control the pressure in the pressurization chamber 111.

That is, the controller 130 can control the flow rate and flow velocity of the pressurizing fluid supplied to the pressurization chamber 111, or control the flow rate and flow velocity of the pressurizing fluid discharged from the pressurization chamber 111, using the calculated value d (step S5), so that it can perform a control to constantly maintain the pressure in the pressurization chamber 111 to a pressure (target pressure) within a set pressure range (step S6).

As such, the control variables for controlling the supply and discharge of the pressurizing fluid for the pressurization chamber 111 are the number of cells 120 being charged and the number of cells 120 being discharged in the all-solid-state battery 110, and as described above, the controller 130 controls the operations of the fluid supply device 152 and fluid controller 155 to control the supply or discharge of the pressurizing fluid and to control the pressure in the pressurization chamber 111.

Specifically, the controller 130 controls the supply or discharge of the pressurizing fluid by adjusting the flow rate K of the pressurizing fluid through the first regulator 157 or the second regulator 160 according to the calculated value d ($=|a-b|$).

At this time, in order to constantly maintain the pressure in the pressurization chamber within the target set pressure range according to the pressure state in the pressurization chamber detected by the pressure sensor 124, when the pressure in the pressurization chamber 111 needs to be increased, the first control valve 156 is opened so that the pressurizing fluid is supplied to the pressurization chamber 111, whereas, when the pressure in the pressurization chamber 111 needs to be decreased, the second control valve 159 is opened so that the pressurizing fluid is discharged from the pressurization chamber 111.

Thus, by controlling the operation of the first regulator 157 or the second regulator 160 in the state in which the first control valve 156 or the second control valve 159 is opened, the controller 130 finely adjusts the flow rate and flow velocity of the pressurizing fluid supplied to the pressurization chamber 111 to a level corresponding to the opening degree of the first regulator 157, or finely adjusts the flow rate and flow velocity of the pressurizing fluid discharged from the pressurization chamber 111 to a level corresponding to the opening degree of the second regulator 160.

Referring to FIG. 3 for more detailed discussion, the charging and discharging of the all-solid-state battery 110 is started in a state where the temperature and pressure in the pressurization chamber have reached the set temperature and set pressure range, and then, the controller 130 calculates the value d based on the real-time charging and discharging state information about each cell 120 in the pressurization chamber 111, and compares the calculated value d with a first threshold value and a second threshold value (Step S4).

Here, the first threshold value may be determined as a value obtained by multiplying the number of all the cells (x) in the pressurization chamber by the first set value, and the second threshold value may be determined as a value obtained by multiplying the number of all cells (x) in the pressurization chamber by the second set value.

In this case, both the first set value (e.g., 0.4) and the second set value (e.g., 0.8) are values set to a value less than 1, and the second set value is set to a value greater than the first set value, and thus the second threshold value (e.g., 0.8x) is set to a value greater than the first threshold value (e.g., 0.4x).

In the embodiment of FIG. 3, the first set value is set to 0.4, and the second set value is set to 0.8, and in this case, the first threshold value becomes the value of 0.4x, which is a value obtained by multiplying the first set value of 0.4 by x which is the total number of the cells in the pressurization chamber, and the second threshold value becomes a value obtained by multiplying the second set value of 0.8 by x which is the total number of the cells in the pressurization chamber.

After the value d is calculated as described above, the controller 130 compares the value d with the first threshold value and the second threshold value (step S4), and, outputs, according to the comparison result, a control signal configured for constantly maintaining the pressure in the pressurization chamber within the set pressure range (step S5).

In this case, the controller 130 determines the flow rate range of the pressurizing fluid according to the comparison result, and controls the opening degree of one selected from the first regulator 157 and the second regulator 160 so as to allow the pressurizing fluid to pass therethrough at a flow rate within the determined flow rate range. At the same time, the controller 130 may be configured to open the one selected from the first control valve 156 and the second control valve 159 according to the current pressure state in the pressurization chamber.

When it is necessary to increase the pressure in the pressurization chamber to maintain the target pressure within the set pressure range, that is, when the pressure in the pressurization chamber detected by the pressure sensor 124 is lower than the set pressure range, the controller 130 may be configured to open the first control valve 156, so that the pressurizing fluid is supplied to the pressurization chamber 111 to increase the pressure in the pressurization chamber, and at this time, the flow rate K of the pressurizing fluid supplied to the pressurization chamber 111 is adjusted by controlling the opening degree of the first regulator 157. Of course, in this case, the second control valve 159 and the second regulator 160 may be controlled to be in a closed state.

On the other hand, when the pressure in the pressurization chamber needs to be lowered to be maintained at the target pressure within the set pressure range, that is, when the pressure in the pressurization chamber detected by the pressure sensor 124 is higher than the set pressure range, the controller 130 may be configured to open the second control valve 159 so that the pressurizing fluid is discharged from the pressurization chamber 111 to lower the pressure in the pressurization chamber, and at this time, the flow rate K of the pressurizing fluid discharged from the pressurization chamber 111 is adjusted by controlling the opening degree of the second regulator 160. Of course, in this case, the first control valve 156 and the first regulator 160 may be controlled to be in a closed state.

In addition, the controller 130 controls the opening degree of one selected from the first regulator 157 and the second regulator 160, wherein the opening degree of the selected regulator is controlled so that the flow rate of the pressurizing fluid passing through the regulator can be controlled to a value within the flow rate range determined according to the calculated value d (step S5).

The control valve and the regulator used to control the pressure in the pressurization chamber 111 in step S5 of FIG. 3 may be either the first control valve 156 and the first regulator 160, or the second control valve 159 and the second regulator 160 selected according to the pressure state in the pressurization chamber.

When described with reference to the embodiment of FIG. 3, if the number of cells being charged (a) and the number of cells being discharged (b) in all the cells 120 in the pressurization chamber 111 during charging and discharging of the all-solid-state battery 110 are equal to each other, that is, if d=0 and a≠0 and b≠0, then it is a state in which the change in the pressure in the pressurization chamber is small.

This state is a state in which only minute pressure adjustment is required to maintain the pressure in the pressurization chamber within the set pressure range, and therefore the controller 130 controls the opening degree of the selected regulator so that the flow rate K of the pressurizing fluid can be controlled to a value within a preset minimum flow rate range.

For example, the minimum flow rate range may be set in the range of $0.004x < K < 0.008x$, where x represents the total number of the cells 120, and K represents the flow rate of the pressurizing fluid passing through the selected regulator.

The flow rate K of the pressurizing fluid passing through the regulator is the flow rate of the pressurizing fluid supplied to the pressurization chamber 111 through the first regulator 157 (when the selected regulator is the first regulator), or the flow rate of the pressurizing fluid discharged from the pressurization chamber 111 through the second regulator 160 (when the selected regulator is the second regulator).

On the other hand, if the value d is equal to or greater than the second threshold value (0.8x) (d≥0.8x) during the charging and discharging of the all-solid-state battery 110, the number of cells 120 being charged or discharged is large, so the pressure in the pressurization chamber may be greatly changed.

In this state, a high flow rate of the pressurizing fluid is required to alleviate the abrupt pressure change, and therefore, the controller 130 controls the opening degree of the selected regulator so that the flow rate K of the pressurizing fluid can be controlled to a value within a preset maximum flow rate range. In the embodiment of the present disclosure, the maximum flow rate range may be set, for example, to the range of $0.03x < K < 0.07x$.

And, when the value d is 0 and a=0, b=0, there are neither cells being charged nor cells being discharged, that is, all the cells 120 in the pressurization chamber 111 are in a rest state, and at this time, since there is no pressure change in the pressurization chamber 111, both the operations of the fluid supply device 152 and the fluid controller 155 are stopped, and in particular, both the first control valve 156 and the second control valve 159 are controlled to be in a closed state so that neither supply nor discharge of the pressurizing fluid occurs for the pressurization chamber 111.

In addition, if the value of d is greater than 0 and less than or equal to the first threshold value (0.4x) (0.4x≥d>0), the controller 130 controls the opening degree of the selected regulator so that the flow rate K of the pressurizing fluid can be controlled to a value within a preset first flow rate range (0.008x<K<0.03x).

Additionally, if the value d is greater than the first threshold value (0.4x) and less than the second threshold value (0.8x) (0.8x>d>0.4x), the controller 130 controls the opening degree of the selected regulator so that the flow rate K of the pressurizing fluid can be controlled to a value within a preset second flow rate range (0.02x<K<0.05x).

In this case, the first flow rate range and the second flow rate range may be set to ranges which overlap partly with each other, and among them, the first flow rate range may be set as a range between the maximum value of the minimum flow rate range and the minimum value of the maximum flow rate range. Also, the second flow rate range may be set such that it has at least a portion overlapping with the maximum flow rate range, and the remaining portion smaller than the maximum flow rate range.

Referring to FIG. 3, it can be seen that the first flow rate range is set to 0.008x<K<0.03x, and it can be seen that the second flow rate range is set to 0.02x<K<0.05x. These flow rate ranges are exemplary, and the present disclosure is not limited thereto, and numerical values such as 0.008x, 0.03x, 0.02x, 0.05x and the like defining each flow rate range can be variously changed according to conditions such as system specifications.

Besides, the numerical values illustrated in FIG. 3, such as the first threshold value and the second threshold value, are merely examples, and the present disclosure is not limited by the example of FIG. 3, and the numerical values illustrated in FIG. 3 may be variously changed.

In this way, in the present disclosure, a control configured for constantly maintaining the pressure applied to the cell 120 in the pressurization chamber 111 during the charging and discharging of the all-solid-state battery 110 within a set pressure range is performed.

In the present disclosure, in order to maintain the pressure applied to the cell 120 in the pressurization chamber 111 within the set pressure range, the supply or discharge of the pressurizing fluid for the pressurization chamber is controlled, wherein the supply rate or discharge rate of the pressurizing fluid is controlled according to the number of cells being charged (a) and the number of cells being discharged (b) in all the cells 120 of the all-solid-state battery 110.

Figure 4:
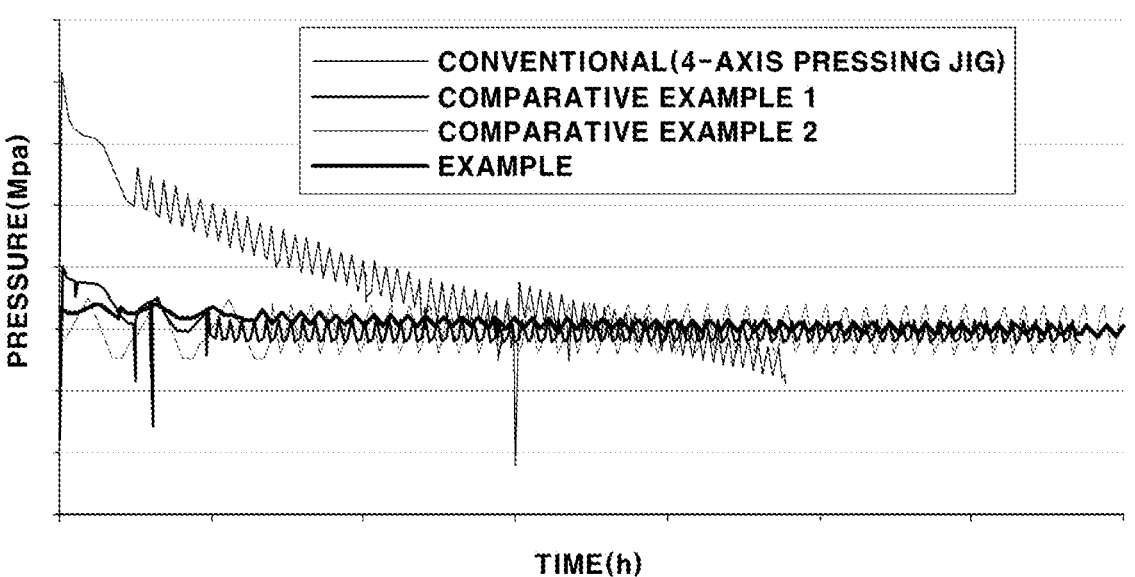
FIG. 4 is a diagram illustrating pressure states applied to cells in a conventional battery and in batteries according to Examples and Comparative Examples of the present disclosure.

FIG. 4 illustrates the pressure states applied to the cells 120 in the conventional all-solid-state battery and to the cells 120 in the all-solid-state battery 110 of the present disclosure, wherein 'conventional' indicates the state of pressure applied to the cells of the all-solid-state battery by the 4-axis pressing jig (having a total of four pressure points at the corners of the rectangular cell), and 'Example' indicates a pressure state when the flow rate of the pressurizing fluid is controlled to an appropriate value in the all-solid-state battery system according to the present disclosure.

In FIG. 4, 'Comparative Example 1' represents a pressure state when the flow rate of the pressurizing fluid is slower than an appropriate value, and 'Comparative example 2' represents a pressure state when the flow rate of the pressurizing fluid is made faster than an appropriate value.

Referring to FIG. 4, it can be seen that the pressure applied to the cell 120 varies greatly depending on the charging and discharging state in the 'conventional' case, and as time elapses, the pressure applied to the cell 120 gradually decreases.

On the other hand, in the case of 'Example', the pressure applied to the cell 120 is maintained almost constantly within the target set pressure range without significant change, and in the case of 'Comparative Example 1' and 'Comparative Example 2', it can be seen that the change in pressure is relatively large compared to the Example.

When the flow rate of the pressurizing fluid is slower than the appropriate level as in 'Comparative Example 1', the volume change and amount change of the pressurizing fluid in the pressurization chamber 111 are smaller than the pressure change amount due to the actual volume expansion of the cells 120, so it is not possible to sufficiently compensate for the pressure change of the cell 120, and as a result, it becomes difficult to obtain a sufficient effect of improving cell performance (the effect of improving initial performance and lifespan characteristics is insufficient).

Contrarily, when the flow rate of the pressurizing fluid is faster than the appropriate level as in 'Comparative Example 2', the volume change and amount change of the pressurizing fluid in the pressurization chamber 111 are larger than the pressure change amount due to the actual volume expansion of the cells 120, so the pressure applied to the cell 120 becomes excessively large, and eventually, a cell short or the like may be caused (coulombic efficiency deteriorates).

Figure 5:
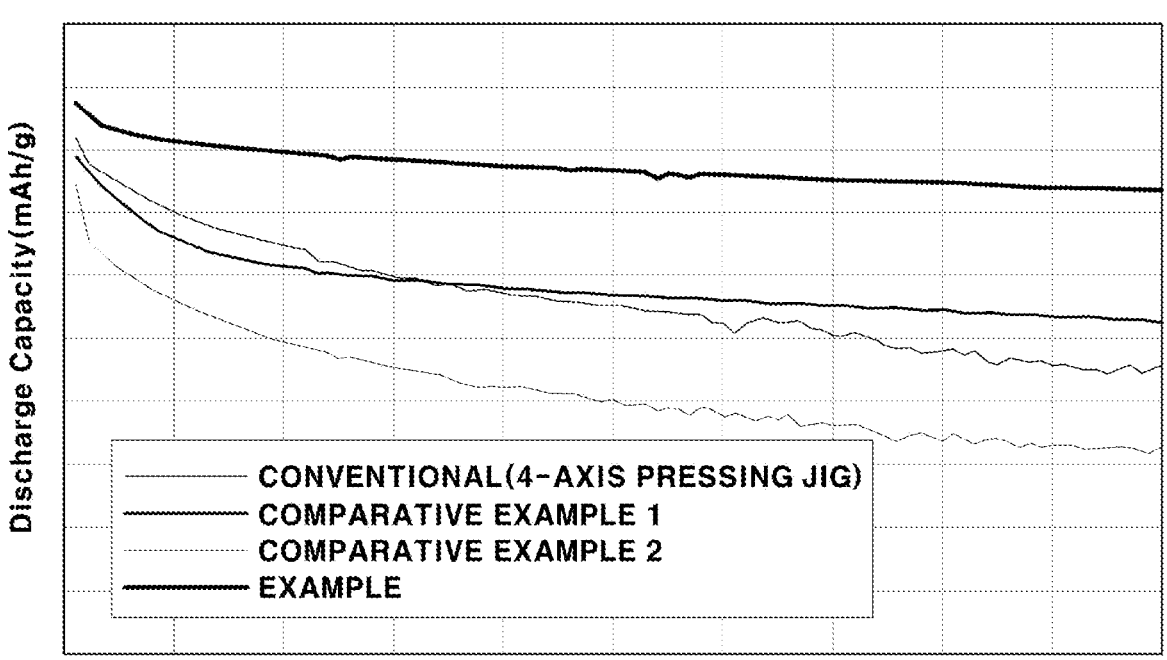
FIGS. 5 to 7 are diagrams showing comparisons of the performances of the conventional battery and the batteries according to Comparative Examples and Examples of the present disclosure.
Figure 6:
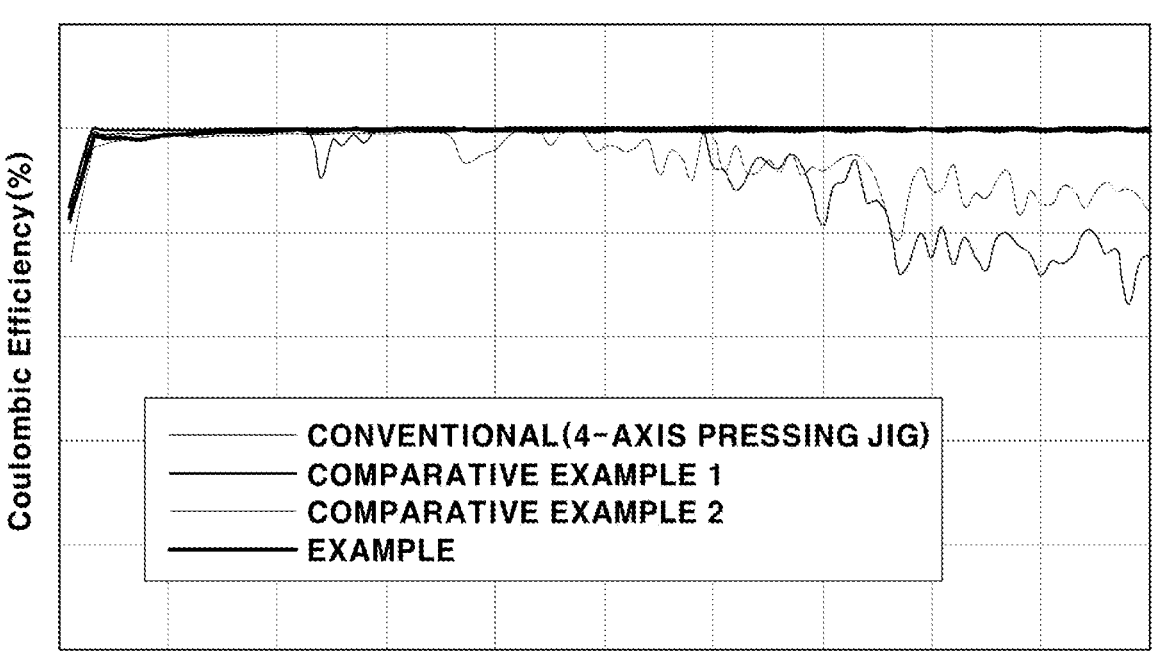
Figure 7:
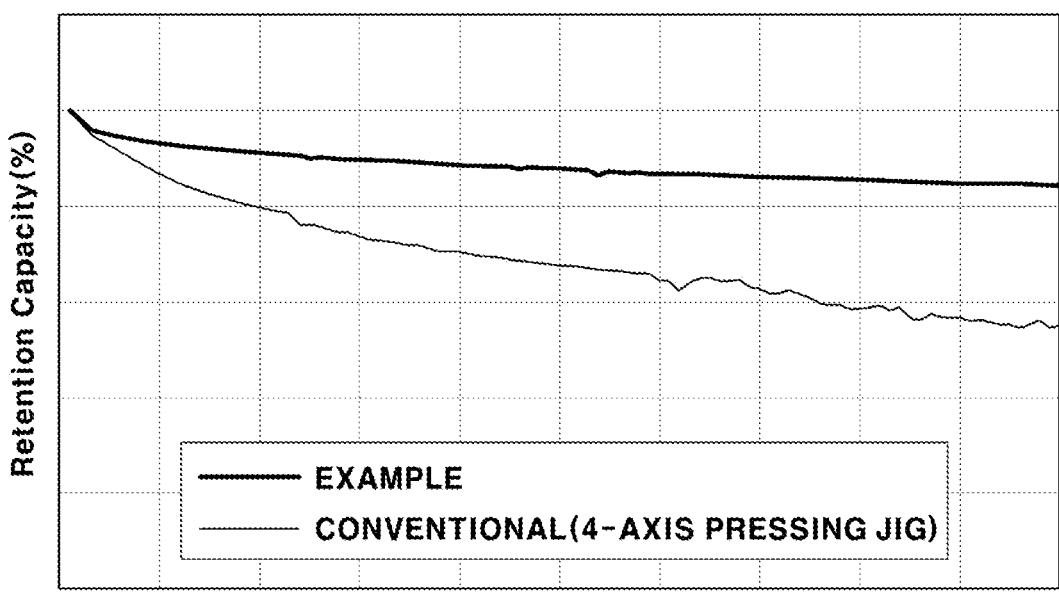

FIGS. 5 to 7 are diagrams showing comparisons of the performances of the conventional battery and the batteries according to Comparative Examples and Examples of the present disclosure. As shown, the respective discharge capacities, coulombic efficiencies, and retention capacities are compared, and, in terms of all, the case of 'Example' is best.

After all, according to the embodiment of the present disclosure, through the use of the pressurizing fluid in the pressurization chamber 111, it is possible to control the pressure change due to the volume change of the cells 120 that occurs during the charging and discharging, and as a result, it is possible to keep the pressure applied to the cells 120 constant. Additionally, in the all-solid-state battery system of the present disclosure, the non-uniform pressure distribution problem that occurs when a conventional pressing jig is used can be alleviated.

As described above, in the present disclosure, as a uniform and constant pressure can be applied to the cell 120, a uniform electrode reaction and lithium deposition in the all-solid-state battery 110 are possible, and as a result, the battery performance can be improved.

While the embodiments of the present disclosure have been described in detail above, the scope of the patent right of the present disclosure is not limited thereto, but various modifications and improvements which could be made by those skilled in the art using the basic concept of the present disclosure defined in the following claims would also fall within the scope of the patent right of the present disclosure.

What is claimed is:

1. An all-solid-state battery system, comprising:

an all-solid-state battery comprising:

a plurality of cells arranged in a closed inner space of a pressurization chamber; and a pressurizing fluid filled in the closed inner space of the pressurization chamber;

a state detector configured to detect state information of the all-solid-state battery;

a controller configured to output a first control signal configured for controlling a pressure applied to the plurality of cells by the pressurizing fluid in the closed inner space of the pressurization chamber based on the state information of the all-solid-state battery detected by the state detector; and a pressurizing device configured to control the pressure applied to the plurality of cells by the pressurizing fluid according to the first control signal outputted by the controller, wherein:

the state information of the all-solid-state battery comprises cell state information indicating the pressure in the pressurization chamber and whether each cell is charged or discharged, the controller is configured to output the first control signal based on a number of cells being charged and a number of cells being discharged in the plurality of cells, and the pressurizing device is configured to control supply and discharge of the pressurizing fluid for the pressurization chamber according to the first control signal outputted by the controller.

2. The all-solid-state battery system of claim 1, wherein the all-solid-state battery is an anodeless-type all-solid-state battery, each cell having a structure in which a negative electrode current collector, a solid electrolyte layer, a positive electrode layer, and a positive electrode current collector are stacked.

3. The all-solid-state battery system of claim 1, wherein the plurality of cells are:

spaced apart from each other in the closed inner space of the pressurization chamber; and pressurized by the pressurizing fluid in an isostatic pressure.

4. The all-solid-state battery system of claim 1, wherein the state detector comprises:

a pressure sensor configured to detect the pressure in the pressurization chamber; and a cell state detector configured to detect the cell state information indicating whether each cell is charged or discharged.

5. The all-solid-state battery system of claim 4, wherein:

the cell state information comprises a voltage of each cell, and the cell state detector comprises a voltage detector configured to detect the voltage of each cell.

6. The all-solid-state battery system of claim 4, wherein:

the state detector further comprises a temperature sensor configured to detect a temperature in the pressurization chamber, and the controller is configured to start charging and discharging each cell when the temperature in the pressurization chamber and the pressure in the pressurization chamber are within a predetermined set temperature range and within a predetermined set pressure range, respectively.

7. The all-solid-state battery system of claim 1, further comprising a temperature adjusting device configured to control the temperature of the all-solid-state battery according to a second control signal outputted by the controller, wherein:

the state detector further comprises a temperature sensor configured to detect a temperature in the pressurization chamber, and the controller is further configured to output the second control signal configured for maintaining the temperature of the all-solid-state battery within a predetermined set temperature range based on the temperature in the pressurization chamber detected by the temperature sensor.

8. The all-solid-state battery system of claim 7, wherein the temperature adjusting device comprises:

a heating device installed on an outer surface of the pressurization chamber and configured to raise the temperature of the all-solid-state battery; and a cooling device operably connected to the pressurization chamber and configured to cool the all-solid-state battery using a cooling water, wherein the cooling device is comprises a cooling water passage provided in the pressurization chamber and a cooling water line.

9. The all-solid-state battery system of claim 1, wherein the controller is configured to output the first control signal configured for maintaining the pressure in the pressurization chamber filled with the pressurizing fluid within a predetermined set pressure range.

10. The all-solid-state battery system of claim 1, wherein the pressurizing device is configured to control a flow rate of the pressurizing fluid supplied to the pressurization chamber or a flow rate of the pressurizing fluid discharged from the pressurization chamber together with an amount of the pressurizing fluid in the pressurization chamber according to the first control signal outputted by the controller.

11. The all-solid-state battery system of claim 1, wherein the pressurizing device comprises:

a fluid storing part configured to store the pressurizing fluid;

a fluid supply device configured to supply the pressurizing fluid stored in the fluid storing part to the closed inner space of the pressurization chamber;

a fluid line configured to connect the fluid supply device, the pressurization chamber, and the fluid storing part; and a fluid adjusting device installed in the fluid line and configured to control supply and discharge of the pressurizing fluid for the pressurization chamber according to the first control signal outputted by the controller.

12. The all-solid-state battery system of claim 11, wherein:

the fluid line comprises:

an inlet side fluid line connecting between the fluid supply device and an inlet port of the pressurization chamber; and an outlet side fluid line connecting between an outlet port of the pressurization chamber and the fluid storing part, and the fluid adjusting device comprises:

a first control valve; and a first regulator installed in the inlet side fluid line configured to control:

an amount of the pressurizing fluid in the pressurization chamber; and a flow rate of the pressurizing fluid supplied to the pressurization chamber; and a second control valve and a second regulator installed in the outlet side fluid line configured to control:

the amount of the pressurizing fluid in the pressurization chamber; and a flow rate of the pressurizing fluid discharged from the pressurization chamber.

13. The all-solid-state battery system of claim 12, wherein the fluid adjusting device comprises:

a first flowmeter installed in the inlet side fluid line configured to detect the flow rate of the pressurizing fluid supplied to the pressurization chamber and configured to input a first flow rate detection signal to the controller; and a second flowmeter installed in the outlet side fluid line configured to detect the flow rate of the pressurizing fluid discharged from the pressurization chamber and configured to input a second flow rate detection signal to the controller.

14. The all-solid-state battery system of claim 12, wherein:

the state information of the all-solid-state battery comprises the pressure in the pressurization chamber, and the controller is configured to output the first control signal configured for maintaining the pressure in the pressurization chamber within a predetermined set pressure range.

15. The all-solid-state battery system of claim 14, wherein:

the state information of the all-solid-state battery further comprises cell state information indicating whether each cell is charged and discharged, and based on the pressure in the pressurization chamber, the number of cells being charged, and the number of cells being discharged in the plurality of cells, the controller is configured to output the first control signal configured for controlling the flow rate of the pressurizing fluid supplied to the pressurization chamber or the flow rate of the pressurizing fluid discharged from the pressurization chamber together with the amount of the pressurizing fluid in the pressurization chamber.

16. The all-solid-state battery system of claim 15, wherein:

the controller is configured to determine a value, d, which is a difference between the number of cells being charged and the number of cells being discharged in the plurality of cells, when the pressure in the pressurization chamber is lower than the set pressure range, the controller is configured to open the first control valve, and based on flow rate information detected by a first flowmeter installed in the inlet side fluid line, the controller is configured to output the first control signal configured for controlling an operation of the first regulator so that the flow rate of the pressurizing fluid supplied to the pressurization chamber is within a flow rate range determined according to the value, d.

17. The all-solid-state battery system of claim 15, wherein:

the controller is configured to determine a value, d, which is a difference between the number of cells being charged and the number of cells being discharged in the plurality of cells, when the pressure in the pressurization chamber is lower than the set pressure range, the controller is configured to open the second control valve, and based on flow rate information detected by a second flowmeter installed in the outlet side fluid line, the controller is configured to output the first control signal configured for controlling an operation of the second regulator so that the flow rate of the pressurizing fluid discharged from the pressurization chamber is within a flow rate range determined according to the value, d.

18. The all-solid-state battery system of claim 1, wherein the pressurizing fluid comprises at least one of:

a liquid or a gas having an electrical conductivity of at least less than 10-10 S/cm;

a liquid or a gas that maintains a liquid or gaseous state and do not undergo an electrochemical reaction in a temperature range of −20° C. to 70° C.;

a liquid or a gas that does not undergo an electrochemical reaction even at 5V or higher; or a non-flammable liquid or an inert gas that is electrically non-conductive.

* * * * *